United States Patent [19]
Lutz et al.

[11] Patent Number: 5,380,812
[45] Date of Patent: Jan. 10, 1995

[54] ONE PART CURABLE COMPOSITIONS CONTAINING DEACTIVATED HYDROSILATION CATALYST AND METHOD FOR PREPARING SAME

[75] Inventors: Michael A. Lutz; Binh T. Nguyen; Russell K. King, all of Midland, Mich.

[73] Assignee: Dow Corning Corporation, Midland, Mich.

[21] Appl. No.: 179,416

[22] Filed: Jan. 10, 1994

[51] Int. Cl.$^6$ .............................................. C08G 77/08
[52] U.S. Cl. ........................................ 528/15; 528/18; 528/21; 528/23
[58] Field of Search ........................ 528/15, 23, 18, 21

[56] References Cited

U.S. PATENT DOCUMENTS

| | | |
|---|---|---|
| 3,188,300 | 6/1965 | Chalk . |
| 3,429,580 | 5/1966 | Beck . |
| 3,453,234 | 7/1969 | Kookootsedes ...................... 528/15 |
| 4,526,954 | 7/1985 | Williams . |
| 4,578,497 | 3/1986 | Onopchenko . |

FOREIGN PATENT DOCUMENTS 0511882 11/1992 European Pat. Off. .

OTHER PUBLICATIONS

Journal of Chemistry Materials, 1989, 1, 106–114, "Preparation and Structure of Platinum Group Metal Colloids: Without Solvent".
J. Am. Chem. Soc., 112, 16, 5998 (1990).
Organometallics, vol. 9, 621–625, 1990.

Primary Examiner—Melvyn I. Marquis
Attorney, Agent, or Firm—Robert Spector

[57] ABSTRACT

The catalyst inhibitors of the present invention react with conventional platinum group metal-containing hydrosilation catalysts to from complexes that delay curing of compositions containing these complexes in the absence of oxygen and SiH-reactive hydroxylated compounds; the compositions comprise (1) curable compounds containing alkenyl radicals and/or silicon-bonded hydroxyl groups, (2) curing agents containing silicon-bonded hydrogen atoms, and (3) a platinum group metal-containing hydrosilation catalyst. Preferred inhibitors provide long term storage stability.

17 Claims, No Drawings

ONE PART CURABLE COMPOSITIONS CONTAINING DEACTIVATED HYDROSILATION CATALYST AND METHOD FOR PREPARING SAME

BACKGROUND OF THE INVENTION

1. Field of the Invention

This invention relates to one-part compositions that cure by a hydrosilation reaction. More particularly, this invention relates to compositions that cure by a platinum group metal-catalyzed hydrosilation reaction and contain a catalyst complex that is inactive only in the absence of oxygen, SiH-reactive hydroxylated compounds and/or heat. Curing of the compositions is achieved by activating the catalyst, thereby initiating curing of the composition.

2. Background Information

Curable compositions containing polyorganosiloxanes or organosiloxane-modified organic polymers yield crosslinked products ranging from flowable gels to elastomers to resins and find use in a wide variety of applications. These compositions can be classified based on the reaction used to cure the compositions. One such class of compositions cures by a hydrosilation reaction that is catalyzed by a metal from the platinum group of the periodic table or a compound of such a metal. These metals include platinum, rhodium and palladium.

The advantages of a hydrosilation cure include not requiring the presence of moisture or excessively high temperatures to initiate the curing reaction. The curing reaction occurs when all of the reactants, namely an organic polymer or polyorganosiloxane containing at least two alkenyl radicals per molecule and a compound containing at least two silicon bonded hydrogen atoms per molecule, are combined with the hydrosilation catalyst under ambient conditions. The obvious disadvantage of this type of curable composition is its poor storage stability. If it is not convenient to prepare the composition just prior to use, one method for overcoming this disadvantage is to prepare a two part composition by packaging the hydrosilation catalyst and the compound containing the silicon-bonded hydrogen atoms in separate containers.

One-part curable compositions with storage stabilities ranging from days to months depending upon the temperature can be prepared using known platinum catalyst inhibitors such as acetylenic compounds and amines or by encapsulating the hydrosilation catalyst in a material that is melted or fragmented to release the catalyst when it is desired to cure the composition. Both of these methods have disadvantages associated with them, including increased cost, relative high curing temperature and/or extended curing times.

The effect of anaerobic conditions, i.e. the absence of molecular oxygen, on the platinum-catalyzed reaction between organohydrogensilanes and alkenes or monomeric organosilicon compounds containing ethylenic unsaturation is reported in the patent and journal literature. U.S. Pat. No. 4,578,497, which issued to Onpochenko and Sabourin on Mar. 25, 1986 reports that oxygen enhanced the rate of the platinum catalyzed hydrosilation of 1-alkenes with mono-, di- and trialkylsilanes to yield the corresponding tetraalkylsilanes.

L. Lewis and N. Lewis in the journal Chemistry of Materials (1989, 1, 106-14) report that the reaction between platinic chloride and dimethylethoxysilane does not occur in the absence of molecular oxygen.

An article by L. Lewis [J. Am. Chem. Soc., 112, 16, 5998, (1990)] reports that formation of a catalytically active colloid by the reaction of a platinum compound with a stoichiometric excess of a silane or disiloxane containing silicon-bonded hydrogen atoms did not occur in the absence of molecular oxygen. The author considers the colloid to be the initiating species for hydrosilation reactions. Other hydrosilation reactions using the colloidal catalyst prepared using platinum or rhodium compounds are described by L. Lewis and R. Uriate in the journal "Organometallics" Vol. 9, pages 621–625, 1990.

Prior art studies on the effect of molecular oxygen on hydrosilation reactions catalyzed by platinum group metals and compounds of these metals did not utilize combinations of reactants capable of forming gels, elastomers, resins and similar high molecular weight crosslinked materials.

Organosiloxane compositions that cure upon heating by a platinum-catalyzed hydrosilation reaction and contain a "conventional" platinum catalyst and a phosphine or phosphite as the platinum catalyst inhibitor are claimed in U.S. Pat. No. 3,188,300 that issued to Chalk on Jun. 8, 1965. Organosiloxane compositions containing these compounds are alleged to be stable for periods up to 24 hours "or longer" at 25° C. There is no teaching in this patent concerning the effect of or any advantage associated with preparing and storing the ingredients of the curable composition and the composition itself in the absence of oxygen or hydroxylated compounds that react with silicon-bonded hydrogen atoms.

Organosiloxane compositions that are stable in the absence of molecular oxygen but cure to yield elastomers or other useful materials in the presence of oxygen by a variety of reactions are known in the art. For example, U.S. Pat. No. 3,249,580, which issued to Beck on May 3, 1966 describes anaerobically stable compositions containing copolymers prepared by reacting a halogen-terminated polysilane containing at least two silicon-bonded hydrogen atoms per molecule with a member of a class of silanol-containing organosilicon compounds that includes polyorganosiloxanes.

U.S. Pat. No. 4,526,954, which issued to Williams on Jul. 2, 1988 describes linear and cyclic organosiloxane polymers that cure in the presence of oxygen but are stable under anaerobic conditions. The polymers are characterized by the presence of at least one 1,3-pentadienyl or 1,4-pentadienyl radical per molecule. The group containing this radical is bonded to silicon through a silicon-carbon bond. This patent also describes curable compositions containing the novel polymers in addition to fillers and curing catalysts.

Published European Patent Application No. 511,882-A1, published on Nov. 4, 1992, describes polyorganosiloxanes containing cyclopentadiene or cyclopentadienyl groups bonded to silicon directly or through a hydrocarbylene radical. The polyorganosiloxanes cure in the presence of moisture or oxygen.

One objective of this invention is to provide compositions that cure by a hydrosilation reaction and exhibit cure inhibition in the absence of molecular oxygen, SiH-reactive hydroxylated compounds and heat. A second objective is to provide a method for preparing these curable compositions using catalyst inhibitors that are active only under anaerobic conditions, in the absence of heat and hydroxylated compounds that react with the silicon-bonded hydrogen atoms present in the composition.

SUMMARY OF THE INVENTION

The present compositions utilize platinum group metal hydrosilation catalysts that are inactive in the absence of oxygen, SiH-reactive hydroxylated compounds and temperatures below about 150° C. to prepare storage stable, one part curable compositions containing as the reactive ingredients (1) at least one curable compound with at least two alkenyl radicals per molecule and (2) at least one crosslinking agent containing at least two silicon-bonded hydrogen atoms per molecule. The compositions are stable until exposed to one or more of the activating agents for the catalyst, at which time they cure in the same manner as conventional compositions containing these ingredients.

DETAILED DESCRIPTION OF THE INVENTION

This invention provides one-part curable compositions that exhibit cure inhibition only in the absence of molecular oxygen and SiH-reactive compounds, wherein said compositions comprise in the absence of oxygen and Si-H-reactive compounds.

A. a curable compound containing at least two ethylenically or acetylenically unsaturated groups per molecule;

B. a curing agent for said composition containing at least two silicon-bonded hydrogen atoms per molecule, where the amount of said curing agent is sufficient to cure said composition in the presence of an active platinum group metal-containing hydrosilation catalyst;

C. an amount of said catalyst sufficient to promote curing of said composition when activated; and D. an amount of an inhibitor sufficient to reduce the activity of said catalyst at 25° C. in the absence of oxygen and SiH-reactive hydroxylated compounds.

This invention also provides a method for preparing and storing compositions wherein curing of the composition is delayed at 25° C. in the absence of molecular oxygen and SiH-reactive hydroxylated compounds, said method comprising the sequential steps of 1) blending to homogeneity A. a curable compound containing at least two ethylenically or acetylenically unsaturated radicals per molecule;

B. a curing agent containing at least two silicon-bonded hydrogen atoms per molecule, where the amount of said curing agent is sufficient to cure said composition in the presence of an active platinum group metal-containing hydrosilation catalyst;

C. an amount of said catalyst sufficient to promote curing of said composition; and D. an amount of an inhibitor sufficient to reduce the activity of said catalyst at 25° C. in the absence of oxygen and SiH-reactive hydroxylated compounds; and 2) storing the resultant mixture, where the composition is prepared and stored under conditions that do not activate said catalyst.

As used in this specification, curing is defined as conversion of a composition from a liquid or gum to a crosslinked gel or elastomer. A reduction in the activity of the hydrosilation catalyst by the present inhibitors implies that the time required for curing to occur at 25° C. in an environment containing no more than 1 part per million each of molecular oxygen and hydroxylated compounds that react with silicon bonded hydrogen is at least twice the time required to cure the same composition at 25° C. in the presence of air.

Preferred compositions will not cure for at least several weeks when stored at temperatures below about 30° C. in an environment that will not fully activate the present catalysts. These compositions cure in less than one day under conditions that fully activate the hydrosilation catalyst.

Curing of the present compositions can be accelerated by heating. Temperatures of at least about 150° C. will fully activate preferred hydrosilation catalysts in the absence of oxygen and SiH-reactive hydroxylated compounds Hydroxylated compounds that react with silicon-bonded hydrogen atoms in the presence of the hydrosilation catalysts referred to as ingredient C of the present compositions include water, alcohols, carboxylic acids, compounds containing silanol ($\equiv$SiOH) groups and mineral acids such as sulfuric and phosphoric acids. These compounds are referred to in this specification as "SiH-reactive hydroxylated compounds".

The Catalyst Inhibitor

The characterizing feature of the present catalyst inhibitors is their ability to delay curing of a composition in the absence of oxygen and SiH-reactive hydroxylated compounds by reacting with the hydrosilation catalyst to form a complex. The activity of catalyst complexes containing these inhibitors is increased in the presence of one or more of these conditions.

The classes of inhibitors that can be used in the present compositions are organophosphorus compounds, including but not necessarily limited to the di- and trihydrocarbylphosphines represented by the formula $R^1{}_aH_{(3-a)}P$, di- and trihydrocarbylphosphine oxides represented by the formula $R^1{}_aH_{(3-a)}P=O$, di- and triorganophosphites represented by the formula $(R^1O)_aH_{(3-a)}P$, phospholene oxides represented by the formula

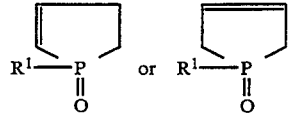

and bis(dihydrocarbylphosphino)alkanes represented by the formula $(R^1{}_2P)_2R^2$. In these formulae $R^1$ represents an unsubstituted or substituted monovalent hydrocarbon radical, $R^2$ represents an unsubstituted or substituted divalent hydrocarbon radical and a is 2 or 3. If more than one $R^1$ substituent is present on a phosphorus atom, these can be identical or different.

Suitable monovalent hydrocarbon radicals include but are not limited to alkyl such as methyl, ethyl, n-propyl, iso-propyl, n-butyl, n-hexyl, n-octyl and n-decyl; substituted alkyl such as chloromethyl, cyanomethyl and 3,3,3-trifluoropropyl; cycloalkyl such as cyclohexyl; aryl such as phenyl and naphthyl; aralkyl such as benzyl phenylethyl; and alkaryl such as tolyl and xylyl.

Preferred catalyst inhibitors include phosphines, phosphites and phosphine oxides such as triphenylphosphine, trioctylphosphine, divinylphenylphosphine, tributylphosphine oxide, trioctylphosphine oxide, and triphenylphosphine oxide.

The present inventors discovered that the cure inhibiting activity of amine oxides and sulfoxides is increased in the absence of molecular oxygen and SiH-reactive hydroxylated compounds, but apparently not to the same degree as for the preferred organophosphorus compounds.

The concentration of inhibitor relative to hydrosilation catalyst that is required to impart a desired curing delay to a curable composition of the present invention in the absence of molecular oxygen and SiH-reactive hydroxylated compounds is determined by a number of factors, including but not limited to the activity of the inhibitor and the curing catalyst. It appears that the molar ratio of catalyst inhibitor to platinum group metal present in the curing catalyst is generally within the range of from 1 to about 200.

For the most effective catalyst inhibitors, such as the triorganophosphines and trialkylphosphine oxides, the molar ratio of inhibitor to platinum group metal is from 2 to about 20.

The relative cure rates of a given composition in the presence and absence of conditions that activate the catalyst complex appears directly proportional to the concentration of inhibitor.

Elevated temperatures will accelerate curing of compositions containing preferred triorganophosphines or -phosphites as inhibitors under conditions that inactivate the inhibitor. The curing times of these compositions can be reduced from weeks or months at 25° C. to days or hours by curing them at temperatures above about 80° C.

As used in this specification, molecular oxygen refers to gaseous oxygen, which can be present alone or as an ingredient of a mixture of gases, including air, where any additional gases are defined as inert because they do not adversely affect the activity of the catalyst inhibitor or curing of the composition under conditions that activate the inhibitor/catalyst complex.

The term "substantial absence of molecular oxygen and SiH-reactive hydroxylated compounds" refers to environments containing less than about 1 part per million of these materials. The present inventors discovered that the cure-inhibiting ability of a given catalyst inhibitor decreases in proportion to the concentration of molecular oxygen and SiH-reactive hydroxylated compounds above this limit.

Methods and devices for removing trace amounts of oxygen and SiH-reactive hydroxylated compounds from environments are known in the art. These methods include but are not limited to the use of nitrogen or other inert gas that has been treated to remove all but trace amounts of oxygen, the use of known oxygen scavengers, and subjecting materials to repeated cycles of freezing, evacuation, and backfilling with an inert gas such as nitrogen.

One method for ensuring against premature curing of the present compositions involves removal of all SiH-reactive hydroxylated compounds from the ingredients of the composition. The ingredients are then sparged with an inert gas such as nitrogen or argon to displace molecular oxygen and stored under this atmosphere until they are transferred to the container in which the curable composition will be prepared and stored. The inert gas preferably contains less than 1 ppm of materials that inactivate the catalyst inhibitor.

In accordance with a preferred method described in the accompanying examples the ingredients of the present compositions are stored and transferred in an enclosed chamber under an atmosphere containing less than 1 part per million of materials that increase the activity of the inhibitor catalyst complex.

Inhibitor Enhancers

The present inventors discovered that the storage stability of compositions containing the inhibitor/catalyst complexes of this invention can be increased if the compositions also contain cyclic organohydrogensiloxanes and/or organosilicon compounds wherein at least one silicon atom is bonded to two or more hydrogen atoms. Compounds of this type include silanes and siloxanes. It is believed that these compounds are typically present as impurities in the organohydrogensiloxanes used as curing agents for the present compositions.

Small differences between cure times of compositions containing active and inactive inhibitor/catalyst complexes may be due to an insufficient concentration of an inhibitor-enhancing organosilicon compound. This is particularly true if the curing agent is an organic polymer that has been modified to contain silicon-bonded hydrogen atoms.

Silanes and disiloxanes that can be used as inhibitor enhancers exhibit the general formulae $H_aY_{4-a}Si$ and $(H_bY_{3-b}Si)_2O$ respectively, where a is 2, 3 or 4, b is 2 or 3, and Y represents a monovalent hydrocarbon radical or an alkoxy group. The silane containing four silicon-bonded hydrogen atoms is typically considered too toxic and explosive for routine use. Linear organosiloxanes containing at least one silicon atom bonded to two or more hydrogen atoms and cyclic organohydrogensiloxanes are also suitable inhibitor enhancers.

The hydrocarbon radical represented by Y in the foregoing formulae are preferably alkyl containing from 1 to 4 carbon atoms or phenyl and the alkoxy groups represented by Y preferably contain from 1 to 4 carbon atoms. These preferences are based on cost and availability of the starting materials used to prepare the silanes.

Although the mechanism by which the inhibitor enhancers increase the time required to cure the present compositions in the presence of an active inhibitor/catalyst complex is not completely understood, it appears that a concentration of at least about 0.1 weight percent, based on the weight of the curable composition is required to obtain a substantial increase in cure time of the present compositions under conditions that do not activate the inhibitor/catalyst complex.

In addition to the hydrosilation catalyst, catalyst inhibitor(s) and the oxygen scavengers described in a subsequent portion of this specification, the curable compositions of this invention contain the compounds that participate in the curing reaction and ingredients such as fillers and property-enhancing additives typically present in compositions that cure by a platinum group metal catalyzed reaction between silicon-bonded hydrogen atoms and alkenyl radicals. The curable reactants can be organic polymers, polyorganosiloxanes or mixtures thereof. These reactants and the other ingredients will now be discussed in detail.

The Curable Ethylenically or Acetylenically Unsaturated Compound (Reactant A)

The curable compound of the present compositions contains at least two ethylenically or acetylenically unsaturated groups. This curable compound, also referred to in this specification as reactant A, includes both organic and organosilicon compounds. Depending upon the nature of the final cured product, this compound can be a monomer, oligomer or polymer. Cured products that can be prepared using the present compositions range in consistency from gels to elastomers to resins.

As used in this specification the term "ethylenically unsaturated group" includes alkenyl radicals such as vinyl, allyl and 1,3-butadienyl in addition to groups containing a carbon-to-carbon double bond and hetero atoms such as oxygen and nitrogen. The latter groups include but are not limited to acryloxy, —O-(O)CCH=CH$_2$, and acrylamido, —HN(O)CH=CH$_2$. The only restriction is that the groups do not interfere with storage or curing of the curable composition.

The term "acetylenically unsaturated group" includes both hydrocarbon radicals such as ethynyl, —C≡C—, and substituted hydrocarbon radicals such as propargyloxy.

The reactive groups present on reactant A are preferably alkenyl and contain from 2 to 20 carbon atoms.

When reactant A contains the preferred alkenyl radicals as the ethylenically unsaturated group and is a polyorganosiloxane, this reactant can be a liquid or pumpable material exhibiting viscosities of from 0.1 to about 1000 Pa.s at 25° C., or a high consistency gum that is characterized in terms of Williams plasticity values.

When ingredient A is a polyorganosiloxane the alkenyl radicals are typically vinyl, allyl, or 5-hexenyl. Vinyl and 5-hexenyl are preferred, based on the cost of the corresponding intermediates and the reactivity of the polyorganosiloxanes containing these radicals.

The organic groups other than alkenyl radicals that are bonded to the silicon atoms of both the polyorganosiloxanes containing alkenyl radicals and the organohydrogensiloxanes described in the following section of this specification are monovalent hydrocarbon radicals that are free of ethylenic unsaturation. These hydrocarbon radicals can be unsubstituted or can contain one or more substituents that will not interfere with curing of the present compositions. Suitable substituents include but are not limited to halogen atoms such as chlorine, bromine and fluorine.

Preferred hydrocarbon radicals include alkyl radicals containing from one to about four carbon atoms, haloalkyl radicals such as chloromethyl and 3,3,3-trifluoropropyl and aromatic radicals such as phenyl and tolyl.

Most preferably at least one of the hydrocarbon radicals present on each silicon atom of the alkenyl-substituted polyorganosiloxane(s) and the organohydrogensiloxanes used to prepare the curable organosiloxane compositions of the present invention is a methyl radical, and any remainder are phenyl and/or 3,3,3-trifluoropropyl, this preference being based on the availability of the reactants typically used to prepare the polyorganosiloxanes and the properties of cured elastomers and other materials prepared from these polyorganosiloxanes.

Representative embodiments of preferred alkenyl-substituted polyorganosiloxanes containing vinyl radicals only at the terminal positions include but are not limited to dimethylvinylsiloxy-terminated polydimethylsiloxanes, dimethylvinylsiloxy-terminated polymethyl-3,3,3-trifluoropropylsiloxanes, dimethylvinylsiloxy-terminated dimethylsiloxane/3,3,3-trifluoropropylmethylsiloxane copolymers and dimethylvinylsiloxy-terminated dimethylsiloxane/methylphenylsiloxane copolymers. The vinyl radicals of these preferred polyorganosiloxanes can be replaced with other alkenyl radicals such as 5-hexenyl.

Copolymers containing dimethylsiloxane, dimethylvinylsiloxane, methylsilsesquioxane and trimethylsiloxy units are also suitable alkenyl-substituted polyorganosiloxanes.

The present curable compositions can contain a single alkenyl-substituted polyorganosiloxane, or two or more of these polyorganosiloxanes. When two or more polyorganosiloxanes are present, these can differ with respect to their molecular weight and/or the number of silicon-bonded alkenyl radicals per molecule.

Organic compounds containing at least two unreacted ethylenically or acetylenically unsaturated groups per molecule are also suitable for use as reactant A. These compounds can be liquid or solid at room temperature and include but are not limited to monomers such as butene, styrene and methyl methacrylate, polyolefins such as polybutadiene, polyethylene, polypropylene and copolymers of styrene with other ethylenically unsaturated compounds such as acrylonitrile and butadiene; and polymers derived from functionally substituted organic compounds such as esters of acrylic, methacrylic and maleic acids.

The organic compounds, oligomers and polymers can be used alone or in combination with polyorganosiloxanes corresponding to the definition of reactant A.

The Curing Agent (Reactant B)

In accordance with the present method, compositions containing alkenyl functional reactants are cured by the reaction of these ingredients in the presence of molecular oxygen and/or SiH-reactive hydroxylated compounds with a curing agent containing at least two silicon-bonded hydrogen atoms, also referred to as Si—H groups, per molecule. The curing agent, referred to as ingredient B, can be an organic monomer, oligomer or polymer containing at least two groups of the formula —SiX$_2$H per molecule, where X represents an unsubstituted or substituted monovalent hydrocarbon radical or an alkoxy group, an organohydrogensilane or organohydrogensiloxane.

Preferred curing agents are organohydrogensiloxanes wherein the organic groups bonded to silicon are monovalent hydrocarbon radicals that are either unsubstituted or contain substituents such as halogen atoms that will not adversely affect the storage stability or curing of the present compositions. Organohydrogensiloxanes contain from as few as four silicon atoms per molecule up to an average of 20 or more, and preferably exhibit a viscosity of up to 10 Pa.s at 25 degrees C.

Ingredient B contains repeating units of the formulae HSiO$_{1.5}$, R$^3$HSiO and/or R$^3{}_2$HSiO$_{0.5}$. The molecules of this ingredient may also include one or more monoorganosiloxane, diorganosiloxane, triorganosiloxy and SiO$_{4/2}$ units that do not contain silicon bonded hydrogen atoms. In these formulae R$^3$ is a monovalent hydrocarbon radical as defined in the preceding section of this specification.

Alternatively, ingredient B can be a cyclic compound containing at least four organohydrogensiloxane units of the formula R$^2$HSiO or a compound of the formula HR$^3{}_2$SiO[(HR$^3$SiO)$_a$SiR$^3{}_2$H, where a is at least 1.

Most preferably R$^3$ is methyl and ingredient B is a linear trimethylsiloxy terminated polymethylhydrogensiloxane or a dimethylsiloxane/methylhydrogensiloxane copolymer containing an average of from 5 to about 50 repeating units per molecule of which from 30 to 100 percent are methylhydrogensiloxane units.

In preferred curable compositions of this invention one or more polydiorganosiloxanes or organic polymers containing at least two alkenyl radicals per molecule react with a relatively low molecular weight, liquid organohydrogensiloxane containing at least two silicon bonded hydrogen atoms per molecule. It will be understood that to obtain crosslinked materials the sum of the average numbers of alkenyl radicals and silicon-bonded hydrogen atoms per molecule of the respective reactants should be greater than 4.

The molecular weights of ingredients A and B together with the number and distribution of the silicon-bonded hydrogen atoms and alkenyl radicals within these ingredients will determine the location of crosslinks in the cured product, which can range in consistency from a glass-like resin to an elastomer to a gel.

The concentration of crosslinks per unit volume is often referred to as the "crosslink density" and determines certain physical properties of the cured elastomer, particularly hardness, tensile strength and elongation. The particular combination of ingredients A and B that will provide the desired combination of physical properties can readily be determined by routine experimentation with a knowledge of this invention.

The molar ratio of silicon bonded hydrogen atoms in ingredient B to the alkenyl radicals present in ingredient A is a major factor in determining the properties of the elastomer or other cured material obtained from the composition. Because of the difficulty often experienced in achieving a complete reaction between all of the silicon bonded hydrogen atoms and all of the alkenyl radicals present in the reaction mixture, it is desirable to have a stoichiometric excess of one of these species in a curable composition. A ratio of from 1.0 to 1.6 silicon bonded hydrogen atoms per alkenyl radical has been found to yield optimum combinations of physical properties. The preferred ratio for a given composition will be determined at least in part by the average molecular weight of ingredient A and the type of organohydrogensiloxane.

It should be understood that when SiH-reactive hydroxylated compounds are used to deactivate the catalyst inhibitor, the curable composition should contain sufficient excess curing agent to react with this inhibitor deactivator.

The Hydrosilation Catalyst

The hydrosilation catalyst used to promote curing of the present compositions can be any of the platinum group metals and compounds of these metals reported in the literature as capable of catalyzing a hydrosilation reaction between alkenyl or alkynyl radicals and silicon-bonded hydrogen atoms.

Useful catalysts include but are not limited to platinum, palladium and rhodium and compounds of these metals, particularly the halides and compounds wherein at least a portion of the halogen atoms have been replaced with other atoms such as hydrogen and/or complexes with ethylenically unsaturated organic or organosilicon compounds.

Preferred hydrosilation catalysts include but are not limited to platinum dichloride, platinum tetrachloride, and complexes obtained by reacting platinum tetrachloride or chloroplatinic acid with olefins, silanes or disiloxanes containing at least one terminally unsaturated hydrocarbon radical per molecule.

When the catalyst is a complex derived from a platinum group metal compound and an ethylenically unsaturated organic or organosilicon compound containing at least one alkenyl radical, the alkenyl radicals contain from two up to about eight carbon atoms when the unsaturated compound is an organosilicon compound. Preferred alkenyl radicals are vinyl, allyl and 5-hexenyl.

Suitable ethylenically unsaturated organosilicon compounds include but are not limited to vinyl-containing silanes, tetraalkyldivinyldisiloxanes, and linear or cyclic organosiloxane oligomers containing up to about 12 siloxane units and at least one alkenyl radical per molecule.

Useful complexes derived from alkenyl-substituted organosilicon compounds and platinum group metal compounds are described in U.S. Pat. Nos. 3,775,452 and 3,715,334 to Karlstadt, and U.S. Pat. Nos. 3,159,601 and 4,288,345 to Ashley. The relevant portions of these patents are incorporated herein by reference.

Particularly preferred coordination complexes are reaction products of halogen-containing platinum compounds such as platinum II chloride and chloroplatinic acid and terminally unsaturated hydrocarbons, alkenyl-substituted silanes and sym-tetraalkyldivinyldisiloxanes. Complexes derived from disiloxanes and chloroplatinic acid are described in U.S. Pat. No. 3,419,593 to Willing et al., the pertinent portions of which are hereby incorporated by reference thereto.

Preferred olefins for preparing complexes with platinum group metals and compounds of these metals contain from 6 to 10 carbon atoms, are terminally unsaturated and include but are not limited to liquid hydrocarbons such as 1-hexene and 1,5-hexadiene.

The concentration of catalyst in the present compositions is sufficient to promote curing of the composition following exposure of the composition to conditions that activate the inhibitor/catalyst complex. This concentration is typically equivalent to from 2 to about 250 parts by weight of platinum group metal present in the catalyst per million parts by weight of curable composition. The optimum catalyst concentration for a given curable composition is dependent upon a number of factors, including the types of alkenyl- and SiH-containing polymers, the molar ratio of silicon-bonded hydrogen atoms to alkenyl radicals present in the composition and the temperature used to cure the composition and the end use application of the cured material. Preferred compositions contain from 10 to about 125 ppm of platinum.

Optional Ingredients

The storage stability of the present compositions in the absence of catalyst-activating conditions can be increased by the addition of conventional platinum catalyst inhibitors. These inhibitors are well known in the art and include but are not limited to actylenic hydrocarbons, such as 1-propyne and 1-butyne, and tertiary amines such as tripropylamine and N,N,N',N'-tetramethylethylenediamine and esters of maleic and fumaric acids. The molar ratio of inhibitor to platinum group metal present in the catalyst is typically from 0.5 to about 500. It should be understood that the optimum concentration will be determined by a number of factors, including but not limited to the activity of the particular inhibitor and the desired storage stability and cure time of the composition.

The inhibitor is preferably added to the composition before the combination of ingredients A and B are present.

The cure rate of the compositions containing the preferred phosphorus-containing catalyst inhibitors in the presence of conditions that activate the inhibitor/catalyst complex can be increased by the presence in the composition of cobalt derivatives of carboxylic acids, such as cobalt (IV) acetate, chelated cobalt compounds derived from beta-keto esters such as cobalt (IV) acetylacetonate and coordination complexes such as dicyclopentadienyl cobalt (cobaltocene). These cobalt compounds catalyze oxidation reactions, including the oxidation of organophosphorus compounds. Other useful oxidation catalysts are compounds of iron, manganese, copper and nickel.

The storage stability of the present compositions containing an active catalyst inhibitor can be further increased by the presence of any of the known oxygen scavengers. Suitable scavengers include but are not limited to carbohydrazide ($H_2NNHC(O)NHNH_2$), aldehydes, amino acids, hydroquinones, active ferrous oxide, organosilicon polyboranes, trialkylboranes, phenylbutenones, and potassium hydroquinone sulfonate.

The reaction rate of the oxygen scavenger with molecular oxygen can be accelerated by use of a suitable catalyst, such as salts of divalent cobalt, copper and manganese.

The concentration of these oxygen scavengers is selected to provide the desired storage stability and cure characteristics, and is typically from about 50 to about 10,000 moles per mole of platinum present in the inhibited catalyst.

In addition to the aforementioned ingredients the compositions can contain other additives including but not limited to reinforcing and non-reinforcing fillers, treating agents for these fillers, pigments, processing aids, adhesion promoters, stabilizers and flame retardants.

Preparation of Curable Compositions

The present compositions are prepared by blending ingredients A and B with the catalyst, at least one of the present catalyst inhibitors and any other additional ingredients under conditions that will not activate the inhibitor/catalyst complex. All of the reactants and other additives should be substantially free of molecular oxygen and SiH-reactive hydroxylated compounds at the time they are combined with the catalyst and inhibitor.

Preferred methods for preparing preferred curable compositions of this invention are described in the accompanying examples.

Compositions with virtually unlimited storage stability can be obtained by preparing the present compositions in two parts, with the catalyst and curing agent (ingredient B) in separate containers. Alternatively, the catalyst and curing agent are separated from the alkenyl compound (ingredient A). When all of the ingredients are combined and stored under conditions that do not activate the inhibitor/catalyst complex, the compositions will have working times of from several hours to several months under ambient conditions with considerably shorter curing times, particularly with heating.

It will be understood that any of the known methods for excluding or removing oxygen and SiH-reactive hydroxylated compounds from an environment can be used to generate the conditions under which the present compositions are prepared and stored. These methods include but are not limited to use of hermetically sealed rigid and flexible containers and storing the compositions in the presence of oxygen-free inert gases and/or oxygen scavengers.

To avoid premature curing of curable compositions containing the present inhibitor/catalyst complexes, all of the reactions used to prepare the catalyst complexes should be conducted in the substantial absence of conditions that activate the catalyst. Known methods for removing molecular oxygen from reactants and reaction vessels include sparging with nitrogen or other inert oxygen-free gas, use of oxygen scavengers, and subjecting reactants to reduced pressure, which can be accompanied by freezing and thawing of the material and back-filling of the container with nitrogen or other inert gas. Under preferred conditions for preparing the present compositions the concentration of oxygen is preferably less than 1 part of oxygen per million parts of nitrogen or other inert gases that constitute the atmosphere under which the compositions are prepared.

In accordance with a preferred method for preparing the present compositions, all ingredients are sparged with an inert gas such as nitrogen or argon and stored under this atmosphere until transferred to the reactor in which the catalyst will be prepared. It should be understood that the gas should be substantially free of catalyst-activating ingredients.

The consistency of the present curable compositions can range from pourable liquids to pastes that flow only under pressure to gum rubber stocks.

Cured materials prepared using the present compositions are useful in the same applications as materials prepared by hydrosilation reactions using conventional platinum catalysts. These uses include but are not limited to elastomers, resins, gels for protecting various substrates, and coatings for paper, electronic circuit boards and other substrates.

Curing of the Present Compositions

The present compositions are cured by exposing them to one or more conditions that activate the inhibitor/catalyst complex and accelerate initiation of the curing reaction. These conditions are the presence of molecular oxygen, SiH reactive hydroxylated compounds and/or elevated temperatures. The oxygen can be present in the curing environment or it can be generated within the curable composition by blending the composition with organic peroxides and subsequently heating the composition to decompose the peroxide. Peroxides that are stable under the conditions used to store the curable compositions can be included as an ingredient of these compositions.

The cure rate of the compositions can be controlled by regulating the temperature and/or the concentration of catalyst-activating ingredients to which the composition is exposed in a given period of time.

The following examples describe preferred methods for preparing one part curable compositions of the present invention. The examples should not be interpreted as limiting the scope of the invention as defined in the accompanying claims. Unless otherwise indicated all parts and percentages in the examples are by weight, viscosity values were measured at 25° C. and the nitrogen atmospheres under which the compositions were prepared and stored contained less than one part per million of oxygen.

Procedure for Preparing Curable

Unless otherwise indicated all of the curable compositions were prepared in a nitrogen-filled glove box (DriBox, model MO40-2 equipped with an ante-chamber, HE/SI Series) available from Vacuum Atmospheres Company. The atmosphere within the glove box contained a maximum of 0.3 ppm of molecular oxygen, a maximum of 1 ppm of water and substantially no other SiH-reactive hydroxylated compounds. All of the ingredients used to prepare curable compositions were exposed to the atmosphere within the glove box for at least 16 hours prior to being used.

Curable compositions were prepared by adding a catalyst composition followed by an inhibitor composition to the alkenyl-substituted polyorganosiloxane selected as ingredient A, and blending the resultant mixture to homogeneity. This mixture was allowed to age for at least 16 hours, at which time the desired amount of organohydrogensiloxane curing agent, ingredient B, was added with stirring. The resultant curable composition was divided into portions for evaluation of storage stability. Two of the portions were stored in sealed containers under nitrogen, one under ambient conditions and one at 50° C. One portion was stored in an open container to determine its curing time in air under ambient conditions.

One of the platinum catalysts was a reaction product of hexachloroplatinic acid and sym-tetramethyldivinyldisiloxane containing 4.21 weight percent of platinum. A catalyst composition (CAT 1) was prepared by dissolving 0.95 g. of this catalyst in 99.05 g. of the alkenyl functional polyorganosiloxane used as ingredient A.

The second catalyst was a reaction product of $PtC_{12}$ and sym-tetramethyldivinyldisiloxane that had been diluted with the dimethylvinylsiloxy-terminated polydimethylsiloxane to a platinum content of 0.62 weight percent. 6.4 g. of this reaction product was blended with 93.6 g. of the polyorganosiloxane used as ingredient A. This catalyst is identified as CAT 2.

The inhibitor compositions (INH) were prepared using an amount of inhibitor equivalent to 4.3 millimoles per 100 g. of the curable composition. The solid phosphorus-containing inhibitors were dissolved in 0.4 g. of dry tetrahydrofuran, the solid amine oxides were dissolved in the same weight of toluene, and the liquid inhibitors were blended directly with ingredient A. The combined weights of inhibitor, tetrahydrofuran or other inhibitor solvent and ingredient A totaled 100 grams in all of the inhibitor compositions.

A mixture of one gram of inhibitor composition and two grams of the catalyst compositions referred to as CAT 1 and CAT 2 provided a molar ratio of inhibitor to platinum in the catalyst composition of 10.

The organic phosphine oxides evaluated and the amounts, equivalent 4.3 mmol, used to prepare the inhibitor compositions were 1.67 g of trioctylphosphine oxide (INH 1), 0.94 g. of tributylphosphine oxide (INH 2), 1.27 g. of tricyclohexylphosphine oxide (INH 3), 1.17 g. of trans-4-diphenylphosphinyl-3-buten-2-one (INH 4), 0.93 g. of 3-methyl-1-phenyl-2-phospholene oxide (INH 5), 1.27 g. of triphenylphosphine oxide (INH 6), and 1.06 g. of diphenylphosphine oxide (INH 7).

EXAMPLE 1

The alkenyl-containing polyorganosiloxane (ingredient A) was a dimethylvinylsiloxy-terminated polydimethylsiloxane having a viscosity of about 0.4 Pa.s at 25° C., and is referred to in the following tables as A 1.

The curing agent (ingredient B) was a trimethylsiloxy-terminated polydiorganosiloxane containing an average of five methylhydrogensiloxane units and three dimethylsiloxane units per molecule with a silicon-bonded hydrogen atom content in the range from about 0.7 to 0.8 weight percent, and is referred to in the following tables as B 1. Ingredient B 1 was prepared by the acid-catalyzed equilibration of cyclic dimethylsiloxanes and methylhydrogensiloxanes in the presence of a low molecular weight organosilicon compound containing trimethylsiloxy groups. It is believed that this curing agent contains at least trace amounts of one or more compounds containing at least one silicon atom bonded to two hydrogen atoms. All of the curable compositions contained 2.28 g. of the curing agent identified as B 1.

The amounts of the various ingredients, the type of inhibitor (INH) the molar ratio of inhibitor to platinum present in the catalyst (INH/Pt) and the time intervals required for the compositions to cure when stored under nitrogen at ambient (Amb.) and 50° C. and following exposure of the compositions to air under ambient conditions are recorded in Table 1.

TABLE 1

| INH | Grams | | | INH/Pt | Cure Time ($N_2$) | | Cure Time (Air) Amb. |
|---|---|---|---|---|---|---|---|
| | CAT 1 | INH | A 1 | | Amb. | 50° C. | |
| INH 1 | 0.2 | 0* | 77.52 | 0 | 20 min. | NE | 20 min. |
| | 0.2 | 0.02 | 77.50 | 2 | 26 hr. | NE | 52 min. |
| | 0.2 | 0.04 | 77.48 | 4 | 2.4 days | NE | 57 min. |
| | 0.2 | 0.08 | 77.44 | 8 | 16 days | NE | 1.5 hr. |
| | 0.2 | 0.2 | 77.32 | 20 | >4 mo. | >4 mo. | 6.5 hr. |
| | 0.2 | 2.0 | 75.52 | 200 | >4 mo. | >4 mo. | 15 hr. |
| INH 1 | 2.0 | 0* | 75.72 | 0 | 5-6 min. | NE | 5-6 min. |
| | 2.0 | 0.02 | 75.70 | 0.2 | 7-8 min. | NE | 7-8 min. |
| | 2.0 | 0.2 | 75.52 | 2 | 15 min. | NE | 15 min. |
| | 2.0 | 1.0 | 74.42 | 10 | >4 mo. | >4 mo. | 75 min. |
| | 2.0 | 2.0 | 73.72 | 20 | >4 mo. | >4 mo. | 150 min. |
| INH 2 | 2.0 | 0* | 75.72 | 0 | 5-6 min. | NE | 5-6 min. |
| | 2.0 | 0.02 | 75.70 | 0.2 | 7-8 min. | | 5-6 min. |
| | 2.0 | 0.2 | 75.52 | 2.0 | 5 days | 2.5 days | 55 min. |
| | 2.0 | 2.0 | 73.72 | 20 | >3 mo. | >3 mo. | 170 min. |
| | 2.0 | 20 | 55.72 | 200 | >3 mo. | >3 mo. | 13 hr. |
| INH 3 | 2.0 | 0* | 75.72 | 0 | 5-6 min. | NE | 5-6 min. |
| | 2.0 | 0.2 | 75.52 | 2 | 5-6 min. | NE | 5-6 min. |
| | 2.0 | 2.0 | 73.72 | 20 | 50 days | 21 days | 110 min. |
| | 2.0 | 10 | 65.72 | 100 | 4 mo. | 2.3 mo. | 30 days |
| | 2.0 | 20 | 55.72 | 200 | 190 days | 3 mo. | 48 days |
| INH 4 | 2.0 | 0* | 75.72 | 0 | 5-6 min. | NE | 5-6 min. |

TABLE 1-continued

| INH | Grams | | | | Cure Time (N₂) | | Cure Time |
|---|---|---|---|---|---|---|---|
|  | CAT 1 | INH | A 1 | INH/Pt | Amb. | 50° C. | (Air) Amb. |
|  | 2.0 | 0.2 | 75.52 | 2 | 5-6 min. | NE | 5-6 min. |
|  | 2.0 | 2 | 73.72 | 20 | 1.2 hr. | NE | 20 min. |
|  | 2.0 | 20 | 55.72 | 200 | >4 mo. | NE | 12 days |
| INH 5 | 2.0 | 0* | 73.72 | 0 | 5-6 min. | NE | 5-6 min. |
|  | 2.0 | 0.2 | 75.52 | 2 | 5-6 min. | NE | 5-6 min. |
|  | 2.0 | 2 | 73.72 | 20 | 10 days | NE | 110 min. |
|  | 2.0 | 10 | 65.72 | 100 | >13 mo. | NE | 27 days |
| INH 6 | 2.0 | 0* | 75.72 | 0 | 5-6 min. | NE | 5-6 min. |
|  | 2.0 | 1 | 74.72 | 10 | 5-6 min. | NE | 5-6 min. |
|  | 2.0 | 2 | 73.72 | 20 | 7-8 min. | NE | 7-8 min. |
|  | 2.0 | 20 | 55.72 | 200 | 2 mo. | 3 wks. | 8 hr. |
| INH 7 | 2.0 | 0* | 75.72 | 0 | 5-6 min. | NE | 5-6 min. |
|  | 2.0 | 0.1 | 75.62 | 1 | 7-8 min. | NE | 7-8 min. |
|  | 2.0 | 0.2 | 75.52 | 2 | 9 days | 3 days | 3.5 days |
|  | 2.0 | 1 | 74.72 | 10 | 2 mo. | 3 wks. | 15 days |

NE = Not Evaluated
* = Included For Comparative Purposes.
> = Sample had not cured at time of last observation

EXAMPLE 2

Curable compositions were prepared and evaluated using the procedures described in the preceding section of this specification entitled "Procedure for Preparing Curable Compositions". The following reactants were used for ingredients A and B of the compositions:

A 1—a dimethylvinylsiloxy-terminated polydimethylsiloxane having a viscosity of about 0.4 Pa.s at 25° C.

A 2—a dimethylvinylsiloxy-terminated polydimethylsiloxane having a viscosity of about 2 Pa.s at 25° C.

A 3—a dimethyl-5-hexenylsiloxy-terminated dimethylsiloxane/methyl-5-hexenylsiloxane copolymer containing 2 mole percent of methyl-5-hexenyl units A 4—an organosiloxane copolymer containing 95 mole percent of dimethylsiloxane units, 0.7 mole percent of dimethylvinylsiloxane units, 1.3 mole percent of trimethylsiloxane units and 1 mole percent of monomethylsiloxy units B 1—a trimethylsiloxy-terminated polydiorganosiloxane containing an average of five methylhydrogensiloxane units and three dimethylsiloxane units per molecule with a silicon-bonded hydrogen atom content in the range from about 0.7 to 0.8 weight percent. Ingredient B1 was prepared as described in Example 1.

B 2—a trimethylsiloxy-terminated dimethylsiloxane/methylhydrogensiloxane copolymer containing 1 weight percent of silicon-bonded hydrogen atoms and exhibiting a viscosity of 30 centistokes. This ingredient was prepared in the same method as curing agent B1.

B 3—a dimethylhydrogensiloxy-terminated polydimethylsiloxane containing about 0.1 weight percent of silicon-bonded hydrogen. This curing agent was prepared by the acid catalyzed equilibration of cyclic dimethylsiloxanes in the presence of a source of dimethylhydrogensiloxane terminal groups.

The catalysts used were CAT 1 and CAT 2 described in the preceding specification.

The inhibitor used was trioctylphosphine oxide (INH 1) and the concentration of catalyst was 2 g. in all of the formulations. The inhibitors were dissolved in tetrahydrofuran and the solution blended with the polymer used as ingredient A as described in the preceding specification such that one g. of the inhibitor composition is equivalent to a molar ratio of inhibitor to platinum of 10 using 1 g. of the catalyst composition CAT 1.

The reactive ingredients used in the curable composition and the results of the cure time evaluations are summarized in Table 2. The symbols representing the various inhibitors used are defined in Example 1.

TABLE 2

| Ingredients | | | Grams | | | Cure Time (N₂) | | Cure Time |
|---|---|---|---|---|---|---|---|---|
| A | B | CAT | A | B | INH | Amb. | 50° C. | (Air) Amb. |
| A 1 | B 1 | CAT 1 | 76.78 | 1.22 | 0* | 3-4 min. | NE | 3-4 min. |
| A 1 | B 1 | CAT 1 | 72.78 | 1.22 | 4 | >3 mo. | >3 mo. | 160 min. |
| A 2 | B 2 | CAT 1 | 76.34 | 1.67 | 0* | 5-6 min. | NE | 5-6 min. |
| A 2 | B 2 | CAT 1 | 74.34 | 1.67 | 2 | >3 mo. | >3 mo. | 3 hr. |
| A 1 | B 2 | CAT 1 | 77.11 | 0.895 | 0* | 5-6 min. | NE | 5-6 min. |
| A 1 | B 2 | CAT 1 | 75.11 | 0.895 | 2 | >3 mo. | >3 mo. | 4.5 hr. |
| A 3 | B 2 | CAT 1 | 72.42 | 5.12 | 0* | 6-7 min. | NE | 6-7 min. |
| A 3 | B 2 | CAT 1 | 70.42 | 5.12 | 2 | >3 mo. | >3 mo. | 115 min. |
| A 3 | B 1 | CAT 1 | 72.42 | 5.58 | 0* | 5-6 min | NE | 5-6 min. |
| A 3 | B 1 | CAT 1 | 70.42 | 5.58 | 2 | >3 mo. | >3 mo. | 180 min. |
| A 2 | B 1 | CAT 2 | 75.72 | 2.28 | 0* | 5-6 min | NE | 5-6 min. |
| A 2 | B 1 | CAT 2 | 75.52 | 2.28 | 0.2 | 35 min. | NE | 12 min. |
| A 2 | B 1 | CAT 2 | 75.12 | 2.28 | 0.6 | 2.5 mo. | 3.5 days | 65 min. |
| A 2 | B 1 | CAT 2 | 74.73 | 2.28 | 1.0 | >4 mo. | >4 mo. | 65 min. |
| A 2 | B 1 | CAT 2 | 73.72 | 2.28 | 2.0 | >4 mo. | >4 mo. |  |

EXAMPLE 3

This example demonstrates the effect of adding a linear or cyclic methylhydrogensiloxane or a silane containing two or three silicon-bonded hydrogen atoms as an inhibitor enhancer (INEN) to a curable composition containing one of the catalyst inhibitors (INH) of the present invention. The abbreviations used to represent particular embodiments of ingredients A, B, catalyst and catalyst inhibitor (INH) are defined in the preceding sections of this specification. The silanes and organohydrogensiloxanes containing silicon-bonded hydrogen atoms are represented in Table 3 as follows:

1=(MeHSiO)$_4$
2=Me$_2$HSiOSiHMe$_2$
3=a liquid trimethylsiloxy-terminated polymethylhydrogensiloxane with a silicon-bonded hydrogen content of 1.6 weight percent
4=phenylmethylsilane In these formulae Me represent methyl. The inhibitor enhancer was dissolved in curing agent B 3 to form a 3 or 10 weight percent solution.

The inhibitor composition, referred to INH 2, contained tributylphosphine oxide and was prepared by dissolving 0.94 g. (4.3 mmol) of this inhibitor in 0.4 g. of dry tetrahydrofuran and diluting the resultant solution with 98.66 g. of a dimethylvinylsiloxy-terminated polydimethylsiloxane having a viscosity of about 0.4 Pa.s at 25° C.

All of the curable compositions contained 5 g. of the composition referred to as CAT 1 as the curing catalyst. The alkenyl-functional polyorganosiloxane was A 4 at a concentration of 167.2 g. with the inhibitor or 187.2 g. in the comparison sample without the inhibitor. Each sample other than the comparison sample without inhibitor contained 20 g. of inhibitor composition, equivalent to a INH/platinum molar ratio of 80. Each sample other than the two comparative samples contained 7.75 g. of ingredient B 3 containing the stability enhancer (INEN).

TABLE 3

| INEN | wt %* | Cure Time (N$_2$) Amb. | Cure Time (Air) Amb. |
| --- | --- | --- | --- |
| None** | 0 | 12–15 min. | 12–15 min. |
| None | 0 | 30 min. | 13 min. |
| 1 | 3 | 14 days | 5.5 hr. |
| 1 | 10 | 41 days | 10 hr. |
| 2 | 3 | 50–55 min | 25–30 min. |
| 3 | 3 | 38 days | 100 min. |
| 4 | 3 | 65 min. | 45 min. |
| 4 | 10 | >2 mos. | 5 hrs. |

\* = Based on curing agent
\*\* = No inhibitor present

The data in Table 3 demonstrate that sym-tetramethyldisiloxane is not a very effective inhibitor enhancer relative to the silane and siloxanes evaluated.

A second set of curable compositions were prepared using A 1 as the alkenyl-functional polymer, B 1 as the curing agent, 2.5 or 5 g. of CAT 1 as the catalyst and INH 2 containing tributylphosphine as the inhibitor. 20 g. of INH 2 and 5 g. the CAT 1 solution is equivalent to an INH 2/Pt molar ratio of 80. The following inhibitor enhancers were added as a 3 or 10 percent by weight solution in the crosslinker:

1—(Me$_2$HSiO)$_4$
4—phenylmethylsilane
5—diethylsilane
6—n-hexylsilane

TABLE 4

| Grams | | | INH 2 | INEN (%) | Cure Time (N$_2$) | Cure Time (Air) |
| --- | --- | --- | --- | --- | --- | --- |
| A 2 | B 1 | CAT 1 | | | | |
| 193.2 | 1.75 | 5 | 0* | None | 8–10 min. | 8–10 min. |
| 173.2 | 1.75 | 5 | 20 | None | >3 mo.** | 10 hr. |
| 173.2 | 1.75 | 5 | 20 | 1 (3) | >7 wks. | 12.5 hr. |
| 173.2 | 1.75 | 5 | 20 | 1 (10) | >7 wks. | 12.5 hr. |
| 173.2 | 1.75 | 5 | 20 | 4 (3) | >8 wks. | 12 hr. |
| 173.2 | 1.75 | 5 | 20 | 4 (10) | >8 wks. | 18 hr. |
| 86.55 | 0.95 | 2.5 | 10 | 5 (3) | >1 mo. | 5.5 hr.+ |
| 86.55 | 0.95 | 2.5 | 10 | 6 (3) | >1 mo. | 5.5 hr.++ |

*Comparative Example
**all tests with sample containing INH 2 under nitrogen are ongoing. Cure times under nitrogen are those at last observation; no samples had cured.
+30 minutes at 90° C.
++25 minutes at 90° C.

EXAMPLE 4

This example demonstrates the effect of cobalt benzoacetonate, a known catalyst for the oxidation of phosphines to phosphine oxides, on the cure rate at elevated temperatures of the present compositions. Using the general procedure described in a preceding section of this specification, curable compositions were prepared by blending 80.3 g. of A2, 2.5 g. of CAT 1, and 6.25 g. of a 0.04 weight percent solution of cobalt benzoylacetonate in A 2, and blending the resultant mixture with 10 g. of INH 2. The resultant mixture was aged for about 16 hours and then blended with 0.95 g. of B1 containing 3 weight percent of diethylsilane as the inhibitor enhancer. The final curable composition cured in 5.5 hours in air under ambient conditions and in 17 minutes at 90° C. A sample that was stored under nitrogen was still liquid after 9 months at ambient temperature.

A second composition was prepared using the same ingredients with the exception of replacing the diethylsilane with an equal weight of n-hexylsilane. The final curable composition cured in 5.5 hours in air under ambient conditions and in 17 minutes at 90° C. A sample that was stored under nitrogen was still liquid after 9 months at ambient temperature.

EXAMPLE 5

This example demonstrates the efficacy of amine oxides as catalyst inhibitors for the present organosiloxane compositions.

Curable compositions were prepared using the ingredients A 2, B 1 and CAT 1 described in the preceding examples. The molar ratio of vinyl radicals to silicon-bonded hydrogen atoms present in the curable composition was 1.25 and the amount of CAT 1 added was 2 g. The inhibitors were various amine oxides used at a mole ratio of from 0.2 to 200 moles of inhibitor per mole of platinum. The inhibitor compositions were prepared by dissolving the amine oxide in 0.4 g. of dry toluene and diluting the resulting solution with A2. The inhibitor compositions each contained 4.3 millimoles of inhibitor. The inhibitor compositions are identified as follows:

INH 8=0.99 g. N,N-dimethyldocecylamine-N-oxide, diluted with 98.7 g. A2
INH 9=0.5 g. 4-methylmorpholine-N-oxide, diluted with 99.1 g. A2
INH 10=0.4 g. pyridine-N-oxide, diluted with 99.2 g. A2
INH 11=0.3 g. triethylamine-N-oxide, diluted with 99.3 g. A2

TABLE 5

| INH type/ amt. (g) | A2 (g) | INH/PT moles | Cure Time (N$_2$) R.T. | 50° C. | Cure Time (Air) R.T. |
|---|---|---|---|---|---|
| None/0 | 75.72 | 0 | 5–6 min. | NE | 5–6 min. |
| 8/1 | 74.72 | 10 | 20 min. | NE | 15 min. |
| 8/10 | 65.72 | 100 | 3.5 days | NE | 6 hrs. |
| 8/20 | 55.72 | 200 | 5.5 days | 2 days | 8.5–9 hrs. |
| 9/2 | 73.72 | 20 | 8–10 min. | NE | 7–8 min. |
| 9/10 | 65.72 | 100 | 2.5–3 days | 1.5 days | 2 hr. |
| 9/20 | 55.72 | 200 | 4.5–5 days | 2.5 days | 2.7 hr. |
| 10/2 | 73.72 | 20 | 10–12 min. | NE | 10 min. |
| 10/20 | 55.72 | 200 | 2–2.5 days | 1 day | 18 hr. |
| 11/2 | 73.72 | 20 | 10 min. | NE | 8 min. |
| 11/20 | 55.72 | 200 | 2 days | 4 hr. | 6 hr. |

To determine the effect of the solvent used to dissolve the inhibitor on storage stability, curable compositions were prepared using the types and amounts of ingredients described in the preceding section of this example, with the exception that the inhibitor composition was prepared using an 8 weight percent solution of the inhibitor in dry tetrahydrofuran rather than as a toluene solution.

TABLE 6

| INH type/amount (g) | A2 (g) | INH/PT moles | Cure Time (N$_2$) R.T. | 50° C. | Cure Time (Air) R.T. |
|---|---|---|---|---|---|
| 8/10 | 65.72 | 100 | 4.5 days | 2 days | 6.5 hr. |
| 8/20 | 55.72 | 200 | 7 days | 2 days | 8 hr. |
| 9/10 | 65.72 | 100 | 3.5 days | 2 days | 2.5 hr. |
| 9/20 | 55.72 | 200 | 6 days | 3 days | 3 hr. |
| 10/10 | 65.72 | 100 | 2.5 days | 1 day | 15.5 hr. |
| 10/20 | 55.72 | 200 | 7 days | 2 days | 18 hr. |
| 11/20 | 55.72 | 200 | 3 days | 1 day | 6 hr. |

EXAMPLE 6

This example demonstrates the effectiveness of two sulfoxides as oxygen-deactivated inhibitors for platinum-containing catalysts. Curable compositions were prepared in accordance with the present general procedure. The phosphine oxides of Example 1 were replaced on an equimolar basis with dimethylsulfoxide (INH 12) and methylphenyl sulfoxide (INH 13). Because these inhibitors were liquids at 25° C., 4.3 mmol of each inhibitor were blended directly with 97.93 g. of polyorganosiloxane A 1 without first being dissolved in an organic solvent. All of the compositions contained 2.276 g. of crosslinker B1 described in Example 1 and 2 g. of the catalyst composition referred to as CAT 1 in Example 1, equivalent to a molar ratio of silicon-bonded hydrogen atoms to vinyl radicals of 1.25. The mixture of inhibitor, catalyst and ingredient A 1 was aged for at least 16 hours prior to the addition of ingredient B 1.

The amount of polymer A 1, the type and amount of inhibitor composition, the molar ratio of inhibitor to platinum, and the cure times under nitrogen and in air are recorded in Table 7.

TABLE 7

| A 1 (g.) | INH Type/Amount (g) | INH/Pt | Cure Time N$_2$ | Air |
|---|---|---|---|---|
| 65.72 | INH 12/10 | 100 | 2 hrs. | 40 min. |
| 55.73 | INH 12/20 | 200 | 6 hrs. | 2.5 hrs. |
| 55.73 | INH 13/20 | 200 | 35 min. | 5–6 min. |

EXAMPLE 7

This example demonstrates the efficacy of organophosphines, organophosphites, and bisdiorganophosphinoalkanes as catalyst inhibitors for the present curable compositions. Compositions containing many of these inhibitors exhibit excellent storage stability under conditions that do not activate the inhibitor/catalyst complex, but require heating to achieve useful cure times when the inhibitor is deactivated. The cure time achieved with heating can be accelerated using cobaltous compounds.

Curable compositions were prepared using the present general procedure with ingredients A 1 and B 1. The amount of ingredient B 1 was equivalent to a molar ratio of silicon-bonded hydrogen atoms in B 1 to vinyl radicals in A 1 of 1.25, and all of the curable compositions contained 2 g. of catalyst composition CAT 1.

The inhibitor compositions contained 4.3 mmol. of one of the following organophosphorus compounds and the specified amounts of A 1 and of dry tetrahydrofuran (THF) used to dissolve the inhibitors:

| | | |
|---|---|---|
| Divinylphenyl-phosphine | (INH 14) | 0.67 g.; 99.33 g. A 1; No THF |
| Dimethylphenyl-phosphine | (INH 15) | 0.6 g.; 99.4 g. A 1; No THF |
| Tribenzylphosphine | (INH 16) | 1.31 g.; 98.29 g. A 1; 0.4 g.; THF |
| Dicyclohexylphenyl phosphine | (INH 17) | 1.19 g.; 98.14 g. A 1; 0.4 g.; THF |
| Iso-propyldiphenyl-phosphine | (INH 18) | 0.99 g.; 98.61 g. A 1; 0.4 g.; THF |
| Triphenylphosphine | (INH 19) | 1.13 g.; 98.47 g. A 1; 0.4 g.; THF |
| Trioctylphosphite | (INH 20) | 1.8 g.; 98.2 g. A 1; No THF |
| Tributylphosphine | (INH 21) | 0.87 g.; 99.13 g. A 1; No THF |
| Methyldiphenyl-phosphine | (INH 22) | 0.60 g.; 99.4 g. A 1; No THF |
| Diphenylphosphine | (INH 23) | 0.80 g.; 99.2 g. A 1; No THF |
| Tributylphosphite | (INH 24) | 1.08 g.; 98.92 g. A 1; No THF |
| Triphenylphosphite | (INH 25) | 1.34 g.; 98.66 g. A 1; No THF |
| Tri-t-butylphosphine | (INH 26) | 0.87 g.; 99.13 g. A 1; No THF |
| Bis(diphenyl-phosphino)ethane | (INH 27) | 1.7 g.; 98.9 g. A 1; 0.4 g.; THF |
| Diphenylethyl-phosphine | (INH 28) | 0.87 g.; 99.13 g; No THF |

The mole ratio of inhibitor to platinum in each of the compositions evaluated together with the cure times of the compositions under nitrogen at room temperature and 50° C. and in air at room temperature and 90° C. are recorded in Table 8

TABLE 8

| INH | INH/PT | Cure Time (N$_2$) R.T. | 50° C. | Cure Time (O$_2$) R.T. | 90° C. |
|---|---|---|---|---|---|
| None | 0 | 5–6 min. | N.E. | 5–6 min. | N.E. |
| 14 | 10 | 3 mos. | 1 mo. | 2 mos. | N.E. |
| 14 | 20 | >5.5 mos. | >5.5 mos. | >5.5 mos. | 2.5 hrs. |
| 15 | 20 | >5.5 mos. | 2.5 mos. | 7 wks. | 1.5 hr. |
| 15 | 200 | >5.5 mos. | 3 mos. | 2.5 mos. | N.E. |
| 16 | 20 | 2.5 mos. | 1.5 mos. | 6 wks. | 1 hr. |
| 17 | 20 | 4 wks. | 2 wks. | 3 wks. | 2.5 hrs. |
| 18 | 20 | 4 mos. | 2 mos. | 3.5 mos. | 2 hrs. |

TABLE 8-continued

| INH | INH/PT | Cure Time (N₂) R.T. | 50° C. | Cure Time (O₂) R.T. | 90° C. |
|---|---|---|---|---|---|
| 19 | 20 | >5.5. mos. | >5.5 mos. | >5.5 mos. | 5 hrs. |
| 19 | 200 | >5.5 mos. | >5.5 mos. | >5.5 mos. | 5 hrs. |
| 20 | 2 | >5.5 mos. | >5.5 mos. | >5.5 mos. | 2.5 hrs. |
| 20 | 20 | >5.5 mos. | >5.5 mos. | >5.5 mos. | 22 hrs. |
| 21 | 20 | >5.5 mos. | >5.5 mos. | >5.5 mos. | 1.5 hrs. |
| 22 | 10 | 92 days | 26 days | 60 days | 2 hrs. |
| 23 | 2 | >20 days | >20 days | >20 days | 2 hrs. |
| 23 | 20 | >6 mos. | >6 mos. | >6 mos. | 22 hrs. |
| 24 | 20 | >5.5 mos. | >5.5 mos. | >5.5 mos. | 4 hrs. |
| 25 | 20 | >5.5 mos. | >5.5 mos. | >5.5 mos. | 47 hrs. |
| 26 | 20 | 3 mos. | 1.5 mos. | 2 mos. | 6 hrs. |
| 27 | 20 | >7 mos. | >7 mos. | >7 mos. | N.E. |
| 28 | 20 | >4 mos. | >4 mos. | >4 mos. | N.E. |

> = Storage stability test is ongoing; sample not cured at last observation indicated in table;
N.E. = Not Evaluated.

EXAMPLE 8

This example demonstrates the effect of water and oxygen, individually and in combination, and the effect of elevated temperatures in activating the inhibitor/catalyst complexes of the present invention.

Vials that had been sparged with dry nitrogen were placed in the dry box and partially filled with 8 g. of curable compositions prepared using the ingredients and procedures described in Example 1 of the present specification, following which the vials were sealed. The types and amounts of ingredients were:

22.0 g. Cat 1; 5.50 g. 5.50 g. INH 2; 827.42 g. polyorganosiloxane A1; and 25.04 g. organohydrogensiloxane B1. The composition contained 10 ppm of platinum, a molar ratio of silicon-bonded hydrogen atoms to vinyl radicals of 1.25:1 and a molar ratio of catalyst inhibitor to platinum of 10:1.

Various amounts of dry oxygen were introduced into the space above the compositions by first withdrawing the same volume of nitrogen using a dried gas syringe and then introducing the oxygen in the same manner. Samples containing an atmosphere of 100% oxygen were prepared by purging the space above the composition for 15 minutes with dry oxygen. Following addition of the oxygen various amounts of deoxygenated water were introduced using a microliter syringe followed by shaking of the vial. The seals of control samples that did not contain either oxygen or water were penetrated with the syringe needle to introduce any contaminants that may have been introduced with the oxygen and water. The samples were observed periodically to determine the time interval following which the sample was no longer flowable. This time interval is recorded in Table 9 as the cure time. The amounts of water are listed as moles of water per mole of silicon-bonded hydrogen atoms present in the composition. The elapsed time to the first observation of a cured sample are recorded in Table 9.

The cure time for samples containing 20 and 100 percent of oxygen were also determined at elevated temperatures. The results of these evaluations are recorded in Table 10.

TABLE 9

| Percent O₂ | H₂O/SiH | Average Cure Time (Hours) |
|---|---|---|
| 50.0 | 0.050 | 136 |
| 100 | 0.050 | 33 |
| 50.0 | 0.100 | 0.83 |
| 100 | 0.100 | 2 |

TABLE 9-continued

| Percent O₂ | H₂O/SiH | Average Cure Time (Hours) |
|---|---|---|
| 0.0 | 0.050 | 136 |
| 50.0 | 0.000 | 294 |
| 100 | 0.000 | 185 |
| 0.0 | 0.100 | 0.5 |

TABLE 10

| Temperature °C. | Cure Time (Hours)* 100% O₂ | 20% O₂ | 0% O₂ |
|---|---|---|---|
| 23.5 | 220 | 310 | |
| 50 | 20 | 25 | >120 |
| 70 | 1.8 | 2.4 | >120 |
| 90 | 0.5 | 0.9 | >50 |
| 150 | 0.1 | 0.1 | 0.1 |

* = Average of two samples

That which is claimed is:

1. A one-part composition curable by a hydrosilation reaction, wherein said composition comprises in the absence of oxygen and Si-H-reactive hydroxylated compounds
   A. a curable compound containing at least two ethylenically or acetylenically unsaturated groups per molecule;
   B. a curing agent for said composition containing at least two silicon-bonded hydrogen atoms per molecule, where the amount of said curing agent is sufficient to cure said composition in the presence of an active platinum group metal-containing hydrosilation catalyst;
   C. an amount of said catalyst sufficient to promote curing of said composition; and
   D. an amount of an inhibitor sufficient to reduce the activity of said catalyst at 25° C. in the absence of oxygen and SiH-reactive hydroxylated compounds.

2. A composition according to claim 1 where said inhibitor is selected from the group consisting of (1) organophosphorus compounds selected from the group consisting of di- and triorganophosphine oxides, -phosphines, and -phosphites, phospholene oxides, and bis(-dihydrocarbyl-phosphino)alkanes; (2) amine N-oxides, and (3) sulfoxides, where the organic groups present on said organophosphorus compounds, amine oxides and sulfoxides are monovalent hydrocarbon radicals, and the molar ratio of said inhibitor to platinum group metal present in said catalyst is from 1 to 200.

3. A composition according to claim 2 where said inhibitor is an organophosphorus compound selected from the group consisting of trialkylphosphine oxides, di- and triorganophosphines, trialkylphosphites, and bis(dihydrocarbylphosphino)alkanes, and the molar ratio of inhibitor to platinum group metal present in said catalyst is from 2 to 20.

4. A composition according to claim 3 where said inhibitor is a triorganophosphine oxide and said composition contains a cobalt compound selected from the group consisting of cobalt carboxylates, chelated cobalt compounds derived from beta-ketoesters and coordination complexes of cobalt with cyclic dienes.

5. A composition according to claim 2 where said curable compound is selected from the group consisting of organic polymers and polyorganosiloxanes, said curing agent is selected from the group consisting of organic polymers containing at least two groups of the formula —SiX$_2$H per molecule, where X represents a monovalent hydrocarbon radical or an alkoxy group, organohydrogensilanes and organohydrogensiloxanes wherein the organic groups bonded to the silicon atoms of said organohydrogensilanes and organohydrogensiloxanes are monovalent substituted or unsubstituted hydrocarbon radicals that are free of ethylenic unsaturation, the sum of the average number of alkenyl radicals per molecule of said curable compound and the average number of silicon-bonded hydrogen atoms present per molecule of said curing agent is greater than 4, said composition contains at least 0.1 weight percent of an inhibitor enhancer selected from the group consisting of silanes represented by the formula $H_aY_{(4-a)}Si$, linear siloxanes containing at least one $H_aSiO_{(4-a/2)}$ unit and cyclic organohydrogensiloxanes, where a is 2 or 3, and each Y is individually selected from monovalent hydrocarbon radicals and alkoxy groups.

6. A composition according to claim 5 where said curable compound is an alkenyl-substituted polyorganosiloxane, said curing agent is an organohydrogensiloxane, the silicon-bonded organic groups of said polyorganosiloxane and said organohydrogensiloxane are selected from the group consisting of unsubstituted and halogenated monovalent hydrocarbon radicals, said platinum group metal is platinum, Y is alkyl containing from 1 to 4 carbon atoms or a combination of alkyl containing from 1 to 4 carbon atoms and phenyl.

7. A composition according to claim 6 where the hydrocarbon radicals other than alkenyl present in said curable compound and said curing agent are selected from the group consisting of alkyl containing from 1 to 4 carbon atoms, phenyl and 3,3,3-trifluoropropyl radicals.

8. A method for preparing an organosiloxane composition exhibiting inhibited curing only in the absence of molecular oxygen and SiH-reactive hydroxylated compounds, said method comprising the sequential steps of:
in the absence of molecular oxygen and SiH-reactive organic compounds,
 1) blending to homogeneity
  A. a curable compound containing at least two ethylenically or acetylenically unsaturated groups per molecule;
  B. a curing agent for said composition containing at least two silicon-bonded hydrogen atoms per molecule, where the amount of said curing agent is sufficient to cure said composition in the presence of an active platinum group metal-containing hydrosilation catalyst:
  C. an amount of said catalyst sufficient to promote curing of said composition; and
  D. an amount of an inhibitor sufficient to reduce the activity of said catalyst at 25° C. in the absence of oxygen and SiH-reactive hydroxylated compounds; and
 2) storing the resultant composition in the substantial absence of molecular oxygen and SiH-reactive hydroxylated compounds.

9. A method according to claim 8 where said inhibitor is selected from the group consisting of (1) organophosphorus compounds selected from the group consisting of di- and triorganophosphine oxides, -phosphines, and -phosphites, phospholene oxides, and bis(-dihydrocarbyl-phosphino)alkanes; (2) amine N-oxides, and (3) sulfoxides, where the organic groups present on said organophosphorus compounds are monovalent hydrocarbon radicals and the molar ratio of said inhibitor to platinum group metal present in said catalyst is from 2 to 200, and said composition is prepared and stored under an atmosphere containing less than 1 part per million of inactivators for said catalyst inhibitor.

10. A method according to claim 9 where said inhibitor is an organophosphorus compound selected from the group consisting of trialkylphosphine oxides, di- and triorganophosphines, trialkylphosphites and bis(dihydrocarbylphosphino)alkanes and the molar ratio of inhibitor to platinum group metal present in said catalyst is from 1 to 20.

11. A method according to claim 10 where said inhibitor is a triorganophosphine oxide, and said composition contains a cobalt compound selected from the group consisting of cobalt carboxylates, chelated cobalt compounds derived from beta-ketoesters and coordination complexes of cobalt with cyclic dienes.

12. A method according to claim 9 where said curable compound is selected from the group consisting of organic polymers and polyorganosiloxanes, said curing agent is selected from the group consisting of organic polymers containing at least two groups of the formula —SiX$_2$H per molecule, where X represents a monovalent hydrocarbon radical or an alkoxy group, organohydrogensilanes and organohydrogensiloxanes wherein the organic groups bonded to the silicon atoms of said organohydrogensiloxanes are monovalent substituted or unsubstituted hydrocarbon radicals that are free of ethylenic unsaturation, the sum of the average number of alkenyl radicals present per molecule of said curable compound and the average number of silicon-bonded hydrogen atoms present per molecule of said curing agent is greater than 4, said composition contains at least 0.1 weight percent of an inhibitor enhancer selected from the group consisting of silanes represented by the formula $H_aY_{(4-a)}Si$, linear organohydrogensiloxanes containing at least one $H_aSiO_{4-a/2}$ unit and cyclic organohydrogensiloxanes, where a is 2 or 3, each Y is individually selected from monovalent hydrocarbon radicals and alkoxy groups, and said composition is prepared and stored under an atmosphere containing less than one part per million of molecular oxygen and SiH-reactive hydroxylated compounds.

13. A method according to claim 12 where said curable compound is an alkenyl-substituted polyorganosiloxane, said curing agent is an organohydrogensiloxane, the silicon-bonded organic groups of said polyorganosiloxane and said organohydrogensiloxane are selected from the group consisting of unsubstituted and halogenated monovalent hydrocarbon radicals, said platinum group metal is platinum, Y is alkyl containing from 1 to 4 carbon atoms or a combination of alkyl containing from 1 to 4 carbon atoms and phenyl.

14. A method according to claim 13 where the hydrocarbon radicals other than alkenyl present in said curable compound and said curing agent are selected from the group consisting of alkyl radicals containing from 1 to 4 carbon atoms, phenyl and 3,3,3-trifluoropropyl radicals.

15. A method according to claim 14 where said composition contains an oxygen scavenger selected from the group consisting of carbohydrazide, aldehydes, hydroquinones, active ferrous oxide, organosilicon polyboranes, trialkylboranes, phenylbutenones, and potassium hydroquinone sulfonate.

16. A method according to claim 15 where said composition contains a catalyst to enhance the activity of said oxygen scavenger.

17. A method according to claim 8 where said composition is stored in at least two containers, where said catalyst and said curing agent are located in different containers, or where said catalyst and said curable compound are located in different containers.

* * * * *